United States Patent [19]

Emslander

[11] Patent Number: 4,846,095
[45] Date of Patent: Jul. 11, 1989

[54] CRITICAL TEMPERATURE INDICATING DEVICE

[75] Inventor: Jeffrey O. Emslander, Oakdale, Minn.

[73] Assignee: Minnesota Mining and Manufacturing Company, St. Paul, Minn.

[21] Appl. No.: 104,637

[22] Filed: Oct. 2, 1987

[51] Int. Cl.$^4$ ............................................ G01K 11/06
[52] U.S. Cl. .................................. 116/206; 116/207; 116/216; 116/219
[58] Field of Search ............... 116/206, 207, 216, 217, 116/219, 221, 21; 374/141, 147, 150, 160, 161, 158, 159, 162, 170; 427/148, 150, 151

[56] References Cited

U.S. PATENT DOCUMENTS

| | | | |
|---|---|---|---|
| 3,177,843 | 4/1965 | Geocaris | 116/219 |
| 3,702,077 | 11/1972 | Szabo | 116/219 X |
| 3,958,528 | 5/1976 | Hill | 116/219 |
| 3,967,579 | 7/1976 | Seiter | 116/219 |
| 4,022,149 | 5/1977 | Berger | 116/219 |
| 4,145,918 | 3/1979 | Couch et al. | 116/216 |
| 4,149,852 | 4/1979 | Tiru et al. | 116/207 X |
| 4,163,427 | 8/1979 | Cooperman et al. | 116/207 X |
| 4,428,321 | 1/1984 | Arens | 116/207 X |
| 4,432,656 | 2/1984 | Allmendinger | 116/216 X |
| 4,457,252 | 7/1984 | Manske | 116/216 |
| 4,539,256 | 9/1985 | Shipman | 428/315.5 |

Primary Examiner—William M. Shoop, Jr.
Assistant Examiner—Paul Ip
Attorney, Agent, or Firm—Donald M. Sell; Walter N. Kirn; David L. Weinstein

[57] ABSTRACT

Device for indicating a critical temperature, such as, for example, the freezing point of a liquid. The device comprises a sheet which is a layer having a multiplicity of micropores therein and a mixture comprising at least two liquids, said mixture incapable of wetting said sheet at a given temperature, but capable of wetting said sheet when the temperature of said mixture reaches a critical value, such as the freezing point of one of the liquids in the mixture. The micropores, or voids, in the microporous layer cause scattering of transmitted light, causing the microporous layer to appear opaque. When the voids are filled with a liquid having substantially the same index of refraction as the material of the microporous layer, the filled voids do not scatter transmitted light, thus rendering the microporous layer transmissive to visible light.

A visible indicator is associated with the layer of microporous film such that at a temperature above the freezing point of the liquid composition, the visible indicator is masked by the layer of microporous film, but at a temperature at or below the freezing point of the liquid composition, the liquid wets out the layer of microporous film, thereby allowing the visible indicator to be seen through the layer of microporous film.

20 Claims, 2 Drawing Sheets

CRITICAL TEMPERATURE INDICATING DEVICE

BACKGROUND OF THE INVENTION

1. Technical Field of the Invention

This invention relates to critical temperature indicating devices. More particularly, it relates to a critical temperature indicating device which provide an irreversible visual signal to the user that a product has been exposed to a predetermined temperature.

2. Description of the Prior Art

Blood, emulsions, pharmaceuticals, beverages, and other items are often chilled in order that they may be preserved for use sometime later. However, the characteristics of these items may change so that they are undesirable for later use or the items may be rendered completely useless if exposed to a lower temperature, usually the freezing point of water. It is, therefore, desirable to provide an indicator device which will accurately show whether or not the temperature of an item or the environment has decreased below a critical value.

It is also desirable that the device provide its indication rapidly and that the indication be irreversible so that the user will be alerted to a previously attained critical temperature, even if that condition does not presently exist.

Many critical temperature indicating devices have been provided which utilize the expansion characteristic of water to break a frangible ampule as, for example, Couch et al U.S. Pat. No. 4,145,918. Once the device shown in the Couch et al patent is exposed to temperatures below the freezing point of water, the volume increase as the water changes to ice causes the ampule to break. After the ice has formed and after the surrounding temperature has returned to a point about the melting point of the ice, the water is absorbed by a dye loaded pad, thus providing an indication that the device had gone through a freeze stage and back through a thaw stage.

Problems have arisen in giving an accurate indication of the passage of the device through the normal freezing point of water, i.e. 32° F. (0° C.), due to the super-cooling effect of water which will permit water in small containers to stay in its liquid state substantially below its normal freezing point. Under some conditions, water may be cooled to as low as 3.2° F. (−16° C.) without freezing. This problem has been partially overcome by the addition of certain nucleating agents to the water.

SUMMARY OF THE INVENTION

This invention provides a critical temperature indicating device that operates on the principle that a mixture comprising two or more liquids, wherein said mixture has a surface energy value such that the mixture is incapable of wetting out a given surface, can be made to wet out that surface if the temperature of the mixture is reduced sufficiently to solidify a portion of one of the liquids and to thereby alter the concentration of liquids in the mixture.

The indicating device of this invention comprises a sheet characterized as being a layer having a multiplicity of micropores therein and a mixture comprising at least two liquids, said mixture incapable of wetting said sheet at a given temperature, but capable of wetting said sheet when the temperature of said mixture reaches a critical value, e.g. the freezing point of one of the liquids. The microporous layer has a large number of voids therein. These voids cause scattering of transmitted light, which results in making the layer appear opaque to the human eye. When the voids are filled with a material having substantially the same index of refraction as the material of the microporous layer, the voids are filled and transmitted light is not scattered by the layer, which results in making the layer transmissive to visible light.

The liquids in the initial mixture have a combined surface energy at too high of a level to allow wetting out of the microporous layer under ambient temperature conditions i.e., above the freezing point of the liquids comprising the mixture. At or below the freezing point of one of the liquids in the mixture, a portion of this higher freezing point liquid solidifies, thereby causing the concentration of the other liquid or liquids to increase sufficiently to allow the liquid phase of the mixture to wet out the microporous layer, causing same to become transmissive to visible light. Associated with said microporous layer is a visible indicator that can be seen through the microporous layer only when the pores of that layer are filled with a liquid having an index of refraction substantially equivalent to that of the material of the microporous layer.

In the preferred embodiment of this invention, the indicating device comprises a receptacle formed of two sheets bonded together along their periphery and a liquid mixture disposed within said receptacle, the first sheet being a layer having a multiplicity of micropores therein, the second sheet being a layer of film that provides a barrier to the evaporation of liquid. The indicating device of the preferred embodiment further comprises a backing in contact with the microporous layer, which backing also provides a barrier to the evaporation of liquid.

DETAILED DESCRIPTION

Figure 1:
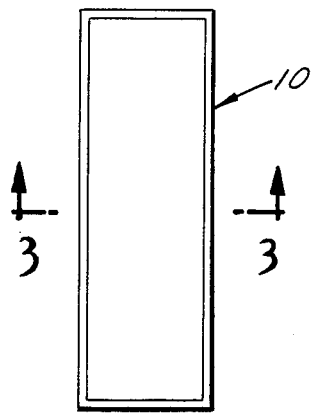
FIG. 1 is a top view of one embodiment of the indicating device of this invention.
Figure 2:
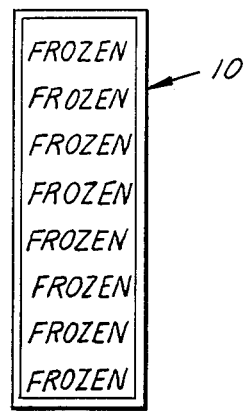
FIG. 2 is a top view of the embodiment of the indicating device of FIG. 1 wherein the freezing point has been reached.
Figure 3:
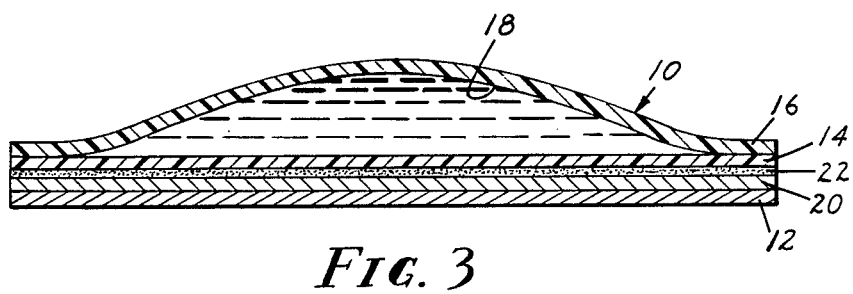
FIG. 3 is a sectional view taken along line 3—3 of the embodiment of the indicating device of FIG. 1.

Referring now to FIGS. 1, 2, and 3, the critical temperature indicating device 10 comprises a backing 12, a microporous layer 14, and a barrier layer 16 bonded to said microporous layer 14 about the periphery thereof, thereby forming a receptacle 18 between layer of film 16 and microporous layer 14. Backing 12 preferably bears a visible indicator 20 thereon that cannot be seen through microporous layer 14 when the critical temperature indicating device has not yet been activated. Microporous layer 14 is bonded to backing 12, preferably by means of a layer of adhesive 22. Receptacle 18 contains a liquid mixture comprising at least two liquids. The liquids in the mixture are present in such a concentration ratio that the mixture has a surface energy such that it will not wet the walls of the pores of microporous layer 14. Upon the temperature dropping to or below the freezing point of one of these liquids, whereby said higher freezing point liquid forms a solid phase, the concentration of liquids in the liquid phase of the mixture will change sufficiently that the liquid phase of the mixture will wet out the pores of microporous layer 14, rendering microporous layer 14 transmissive, i.e. transparent or translucent, to visible light, thereby allowing one to view visible indicator 20 that had previously been blocked by microporous layer 14, on account of apparent opacity resulting from the scattering of incident light.

Figure 4:
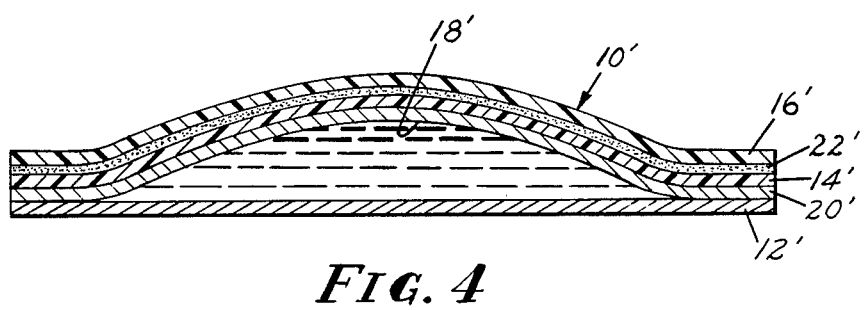
FIG. 4 is a sectional view of a second embodiment of the indicating device of FIG. 1.

In an alternative embodiment, as shown in FIG. 4, backing 12', microporous layer 14', barrier layer 16', receptacle 18', visible indicator 20', and layer of adhesive 22' are equivalent to their counterparts in FIG. 3, the sole exception being their location relative to one another. Receptacle 18' is disposed between backing 12' and visible indicator 20'. Visible indicator 20' is bonded to microporous layer 14', and barrier layer 16' is bonded to microporous layer 14', preferably by means of a layer of adhesive 22'.

Backing 12, 12' must present a barrier to the evaporation of the liquids in the mixture. Materials that are suitable for preparing backing 12, 12' include polymeric films, metallic foils, and laminates comprising said films and foils. The preferred materials for backing 12 are such polymeric film as saran, polyethylene, polyester, and such metallic foils as aluminum foil. Backing 12, 12' preferably has a visible indicator 20, 20' applied thereto, which will be masked when the pores of microporous layer 14, 14' are not wet out, i.e. when the microporous layer appears opaque, but which will be visible when the pores of microporous layer 14, 14' are wet out, i.e. when the microporous layer appears transparent or translucent. A representative example of a visible indicator 20, 20' is a printed layer bearing a message on at least one major surface thereof. The printed layer is typically formed from an appropriate printing ink.

At least a portion of microporous layer 14, 14' must appear to be opaque when the surfaces of its pores are not wetted out. It must be transmissive to visible light when the surfaces of its pores are wetted out. Only the portion of microporous layer 14, 14' that masks visible indicator 20, 20' needs to appear opaque initially. An example of a material that is suitable for the microporous layer 14, 14' is described in U.S. Pat. No. 4,539,256, incorporated herein by reference. The microporous layer described in that patent is composed of randomly dispersed, equiaxed, irregularly shaped particles of thermoplastic polymer. Particles are spaced from one another to provide a network of micropores therebetween. Particles are connected to each other by fibrils which radiate from each particle to the adjacent particles.

Barrier layer 16, 16' must present a barrier to the evaporation of the liquids in the mixture. This layer must be at least partially transmissive to visible light so that the visible indicator can be seen therethrough when the critical temperature has been reached. Materials that are suitable for preparing barrier layer 16, 16' include polymeric films, e.g. coextruded polymeric films, laminated films. The preferred material for barrier layer 16, 16' is a heat sealable film, such as, for example, polyethylene or polyethylene-coated polyester film.

Adhesives for adhesive layers 22, 22' are preferably pressure-sensitive adhesives, such as, for example, silicone-based adhesives, e.g., polysiloxanes, acrylic-based adhesives, e.g., isooctyl curylate/acrylic acid copolymers, rubber-based adhesives, e.g., styrene-isoprene-styrene block copolymers, styrene-butadine-styrene block copolymers, and nitrile rubbers, e.g., acrylonitrile-butadiene, and mixtures of the foregoing. Pressure-sensitive adhesives are well-known to one of ordinary skill in the art.

Figure 5:
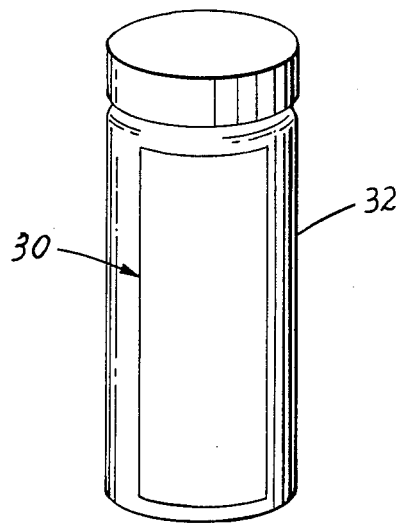
FIG. 5 is a side view in elevation of a third embodiment of the indicating device of this invention.
Figure 6:
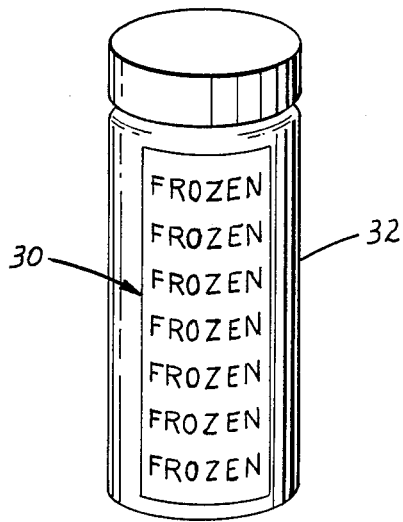
FIG. 6 is a side view in elevation of the embodiment of the indicating device of FIG. 5 wherein the freezing point has been reached.
Figure 7:
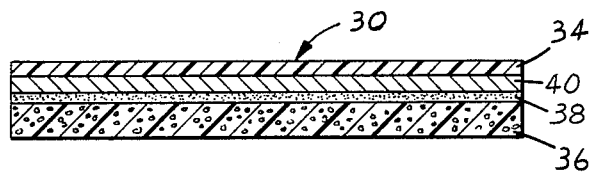
FIG. 7 is a sectional view of the indicating device of FIG. 5.

In another embodiment of this invention, shown in FIGS. 5, 6, and 7, temperature indicating device 30 can merely be immersed in a vial 32 containing an appropriate liquid mixture. In this embodiment, it is preferred that microporous layer 34 be adhered to a backing 36, preferably by means of an adhesive 38, preferably a pressure-sensitive adhesive, such as those preferred for layers 22, 22' described previously. The purpose backing 36 is to provide support to microporous layer 34. It is also preferred that visible indicator 40 be disposed between microporous layer 34 and backing 36. It is also required that vial 32 present a barrier to the evaporation of liquids contained therein. When the temperature of the liquid mixture in vial 32 reaches the critical temperature, a portion of the liquid will solidify, and the liquid mixture in liquid phase will wet out microporous layer 34, thereby rendering it transparent or translucent. Microporous layer 34, backing 36, adhesive layer 38, and visible indicator 40 are essentially identical to microporous layer 14, backing 12, adhesive layer 22, and visible indicator 20, respectively.

Regardless of the embodiment, the liquid mixture comprises at least two liquids. One of these liquids, the first liquid, must be incapable of wetting out the pores of microporous layer 14, 14', 34. It is to be understood that any reference to microporous layer 14 also refers to microporous layers 14' and 34. It is the freezing point of this liquid that can be determined by the indicating device of the present invention. The other liquid, the second liquid, must be capable of wetting out the pores of microporous layer 14. It is also necessary that the mixture in its initial state be incapable of wetting out the pores of microporous layer 14 at temperatures above the freezing point of the first liquid, but capable of wetting out the pores of microporous layer 14 at or below the freezing point of the first liquid, when a sufficient amount of said first liquid has solidified to cause the concentration of the second liquid in the mixture to increase enough to allow the solution to wet out the pores of microporous layer 14.

In order to indicate the approximate freezing temperature of water, i.e., 26° F. to 28° F., it has been found that a solution containing about 2% by weight n-butanol and about 98% by weight water is excellent. Another solution that can be used to indicate the approximate freezing temperature of water, i.e., 26° F. to 28° F., contains about 10% by weight methyl ethyl ketone and about 90% by weight water.

In certain cases, it may be useful to introduce additives into the liquid mixture in order to allow the mixture to indicate temperatures slightly higher or slightly lower than could be indicated by the liquids alone. For example, in order to raise the temperature to be indicated to nearly 32° F., a seeding agent can be added to a liquid mixture containing water and a second liquid. As another example, in order to lower the temperature to be indicated below 32° F., a salt can be added to a liquid mixture containing water and a second liquid.

The true freezing point of a mixture containing about 98% by weight water and about 2% by weight n-butanol is approximately 30° F., only 2° F. lower than that for pure water. However, at a temperature of approximately 26° F. to 28° F., the solution begins to freeze, with pure water freezing first. Upon the commencement of freezing, the concentration of n-butanol in the liquid mixture begins to rise, and continues to rise as freezing progresses. It has been observed that a 2% by weight aqueous solution of n-butanol will not wet out the pores of microporous layer 14, yet a 4% by weight to 5% by weight aqueous solution of n-butanol will wet out the pores of microporous layer 14. Similarly a 12% by weight to 13% by weight aqueous solution of methyl ethyl ketone will wet out the pores of microporous layer 14.

The freezing point of a mixture containing about 99% by weight ethanolamine and about 1% by weight n-butanol can be determined with the indicating device of this invention. This freezing point ranges from about 5° F. to about −4° F.

Because the pores of microporous layer 14 are so convoluted, if the temperature of the indicating device returns to a level in excess of the freezing point of water, the liquid is unable to leave the pores, thereby rendering microporous layer 14 permanently transparent or translucent.

In making the selection of liquids for the critical temperature indicator of this invention, it is preferred that the two liquids not form an azeotrope so that the solution will undergo a change in concentration when the critical temperature is reached. It is axiomatic that the freezing point of the liquid whose freezing point is not being indicated have a freezing point lower than that of the liquid whose freezing point is being indicated, so that it can easily flow into the pores of the microporous layer as the freeze indicating point is reached.

Figure 8:
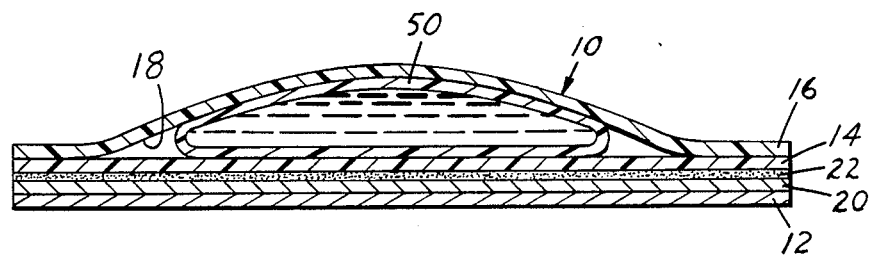
FIG. 8 is a sectional view of a fourth embodiment of the indicating device of this invention.

It is expected that the indicating devices of this invention will be shipped from the point of manufacture to the point of use. During transportation, it is possible that the liquid mixture would freeze and wet out the microporous layer. In order to minimize the possibility of this happening, the liquid mixture can be encased in a rupturable container 50, which container can be introduced into receptacle 18 during the manufacture of indicating device 10 (see FIG. 8). Rupturable container 50 should be made of a material impermeable to the liquid mixture contained therein. A preferred rupturable container is formed of polymeric material, and can be sealed by means of heat or an adhesive, preferably by means of heat. Prior to using the temperature indicating device, rupturable container 50 should be broken, typically by pressure applied to said rupturable container, as by the hand of the user. Care must be taken so as not to destroy the indicating device while rupturable container 50 is being ruptured. Rupturable container 50 can also be used with the embodiment shown in FIGS. 5 and 6 so long as the container can be ruptured without damaging the vial.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A device for indicating the freezing point of a liquid comprising:
   a. a layer of film having a multiplicity of micropores therein,
   b. a barrier layer sealed to said layer of microporous film at the periphery thereof to form a receptacle between said barrier layer and said layer of microporous film,
   c. a liquid composition disposed in said receptacle, said composition comprising at least two liquids, one of said liquids having a surface energy sufficiently low that it is capable of wetting out the micropores of said microporous layer, the other of said liquids having a surface energy insufficiently low that it is incapable of wetting out the micropores of said microporous layer, whereby above the freezing point of said liquid having insufficiently low surface energy, the mixture will not wet out the micropores of said microporous layer, but at or below the freezing point of said liquid having insufficiently low surface energy, the mixture will wet out the micropores of said microporous layer.

2. Device according to claim 1 further including a vapor-impermeable backing adhered to said layer of microporous film.

3. Device according to claim 1 further including a visible indicator associated with said layer of microporous film, said visible indicator being masked by said layer of microporous film at a temperature above the freezing point of said liquid having insufficiently low surface energy, said visible indicator capable of being seen at or below the freezing point of said liquid having insufficiently low surface energy.

4. Device according to claim 3 wherein said visible indicator is a printed layer.

5. Device according to claim 1 wherein said liquid composition comprises n-butanol and water.

6. Device according to claim 1 wherein said liquid composition comprises methyl ethyl ketone and water.

7. Device according to claim 1 wherein said freezing point ranges from about 26° F. to about 28° F.

8. Device according to claim 1 wherein said barrier layer is a vapor-impermeable film.

9. Device according to claim 1 wherein said liquid composition is disposed in a rupturable container disposed within said receptacle.

10. Device according to claim 1 wherein said liquid composition further includes a seeding agent.

11. Device according to claim 1 wherein said liquid composition further includes a salt.

12. A device for indicating the freezing point of a liquid comprising:
   a. a layer of film have a multiplicity of microporous therein,
   b. a vial enclosing said layer of microporous film,
   c. a liquid composition disposed in said vial, said composition comprising at least two liquids, one of said liquids having a surface energy sufficiently low that it is capable of wetting out the micropores of said microporous layer, the other of said liquids having a surface energy insufficiently low that it is incapable of wetting out the micropores of said microporous layer, whereby above the freezing point of said liquid having insufficiently low surface energy, the mixture will not wet out the micropores of said microporous layer, but at or below the freezing point of said liquid having insufficiently low surface energy, the mixture will wet out the micropores of said microporous layer.

13. Device according to claim 12 further including a backing adhered to said layer of microporous film.

14. Device according to claim 12 wherein said liquid composition comprises n-butanol and water.

15. Device according to claim 12 wherein said liquid composition comprises methyl ethyl ketone and water.

16. Device according to claim 12 wherein said freezing point ranges from about 26° F. to about 28° F.

17. Device according to claim 12 further including a visible indicator associated with said layer of microporous film, said visible indicator being masked by said layer of microporous film at a temperature above the freezing point of said liquid having insufficiently low surface energy, said visible indicator capable of being seen at or below the freezing point of said liquid having insufficiently low surface energy.

18. Device according to claim 12 wherein said liquid composition is disposed in a rupturable container disposed within said vial.

19. Device according to claim 2 wherein said liquid composition further includes a seeding agent.

20. Device according to claim 12 wherein said liquid composition further includes a salt.

* * * * *